Patented Oct. 17, 1939

2,176,860

UNITED STATES PATENT OFFICE 2,176,860

METHOD OF PRESERVING RUBBER

Robert L. Sibley, Nitro, W. Va., assignor, by mesne assignments, to Monsanto Chemical Company, St. Louis, Mo., a corporation of Delaware No Drawing. Application March 21, 1934, Serial No. 716,731. Renewed March 1, 1939

19 Claims. (Cl. 18—50)

This invention relates to the manufacture of rubber and rubber-like compounds and it has particular relation to the manufacture of compounds of that character which are exposed to the effects of light, heat and oxygen.

The object of the invention is to provide a rubber compound which offers particular high resistance to the above deterioration agencies thereby extending the period of usefulness thereof.

Heretofore, it has been observed that rubber and rubber-like materials, such as gutta percha upon exposure to light, air or heat either alone or in combination, tended quickly to harden or lose their tensile strength and elasticity thereby becoming unfit for further service. It has been proposed to overcome these effects by incorporating into the rubber or rubber-like compounds certain organic materials termed "anti-oxidants" or age resisters. The chief object of this invention, then, is to provide a new and superior class of age resisters or antioxidants.

The substances which are employed as anti-oxidants or age resisters according to the present invention or aldehyde derivatives of condensation products of a ketone and a phenol.

For example, the following materials are typical members of the class of substances outlined above: condensation product of acetone and phenol, further reacted with butyl aldehyde; condensation product of methyl ethyl ketone and cresol, further reacted with acetaldehyde; condensation product of cyclohexanone and phenol, further reacted with formaldehyde; condensation product of cyclohexanone and phenol, further reacted with butyl aldehyde; condensation product of cyclohexanone and phenol, further reacted with benzaldehyde; condensation product of 1-methyl cyclohexanone and phenol, further reacted with acetaldehyde and butyl aldehyde respectively; condensation product of 1,3-dimethyl cyclohexanone and cresol, further reacted with formaldehyde; condensation product of 1,3-diethyl cyclohexanone and pyrocatechol, further reacted with heptaldehyde; condensation product of cyclohexanone and cresol, further reacted with formaldehyde, butyl aldehyde and benzaldehyde respectively; condensation product of cyclohexanone and pyrocatechol, further reacted with formaldehyde and butyl aldehyde respectively.

The following is given as one method of preparing the preferred class of compounds. 98 parts by weight of cyclohexanone (one molecular proportion) and 376 parts by weight of phenol (substantially 100% excess over two molecular proportions) were placed in a suitable reactor, substantially 80 to 90 parts by weight of hydrochloric acid added thereto and the mixture heated preferably at a temperature of substantially 60° to 70° C. for a suitable period of time, for example three hours. On completion of the reaction, the insoluble matter comprising crude 1,1-di(p-hydroxy phenyl) cyclohexane was removed from the reaction mass preferably by filtration, washed with water to remove the excess phenol and dried. If desirable, the product prepared as described, may be further purified, as for example by washing with alcohol, whereupon after drying a white powder melting at substantially 184° to 186° C. is obtained. 54 parts by weight of the cyclohexanone-phenol product prepared as described above (substantially 0.2 molecular proportions) and 30 parts by weight of butyl aldehyde (a slight excess over 0.4 molecular proportion) were dissolved in a convenient quantity of a suitable organic solvent, for example ethyl alcohol, after which the solution was heated at refluxing temperature for a suitable period of time, for example five hours in the presence of hydrochloric acid gas. On completion of the reaction, the solvent was removed therefrom, and the residue washed with water until neutral and dried. The product so obtained, comprising a brittle resin melting at substantially 100° to 105° C., was incorporated in a rubber stock comprising

| | Parts |
|---|---|
| Pale crepe rubber | 100 |
| Zinc oxide | 60 |
| Lithopone | 20 |
| Sulfur | 2 |
| Benzothiazyl-thio-benzoate | 0.825 |
| Diphenyl guanidine phthalate | 0.675 |
| Paraffin | 0.250 |
| Butyl aldehyde derivative of the condensation product of cyclohexanone and phenol set forth above | 1.0 |

The rubber stock so compounded was then vulcanized by heating sheets of the stock in the usual manner for different periods of time in a press maintained at the temperature of twenty pounds of steam pressure per square inch (that is 258° F.). Portions of the stock cured as set forth were then artificially aged by heating said stock in the Bierer-Davis oxygen bomb for 120 hours at a temperature of 70° C. and under a pressure of 300 pounds of oxygen per square inch. The results obtained on testing the aged and unaged vulcanized stocks follow:

*Table I*

| Cure | | Hrs. aged | Modulus of elasticity in lbs/in.² at elongations of— | | Tensile at break in lbs/in.² | Ult. elong., percent |
|---|---|---|---|---|---|---|
| Time, mins. | Lbs. steam pressure | | 300% | 500% | | |
| 30 | 20 | 0 | 600 | 1870 | 4070 | 690 |
| 30 | 20 | 120 | 769 | 2210 | 3720 | 640 |
| 45 | 20 | 0 | 690 | 2045 | 4220 | 690 |
| 45 | 20 | 120 | 810 | 2310 | 3655 | 625 |
| 60 | 20 | 0 | 718 | 2050 | 4145 | 675 |
| 60 | 20 | 120 | 836 | 2255 | 3515 | 630 |

From the data set forth in Table I it is shown that the new and preferred class of materials comprise an important class of rubber antioxidants or age resisters.

Many of the antioxidants heretofore employed cannot be used in white colored stocks for the reason that darkening of the stocks takes place either in the vulcanizing step or on exposure to sunlight or ultra violet light or both. The new and preferred class of antioxidants possesses the added advantage in that white stocks wherein they are incorporated are markedly resistant to the discoloring influence of both sunlight and ultra violet light. Thus, as one example showing this added very desirable characteristic of the preferred class of compounds, strips of each of the three cures of the above unaged vulcanized rubber stock were exposed to ultra violet light rays generated by a mercury arc light maintained nine inches from the rubber test strips. After 30 hours exposure in the manner described, the rubber test strips containing the preferred class of antioxidants, for example the butyl aldehyde derivative of the condensation product of cyclohexanone and phenol, showed substantially no discoloration.

Other members of the preferred class of antioxidants have been prepared in a manner analogous to that by which the butyl aldehyde derivative of the condensation product of cyclohexanone and phenol has been obtained. Thus 54 parts by weight of the cyclohexanone-phenol condensation product (substantially 0.2 molecular proportion) and 42 parts by weight of benzaldehyde (substantially 0.4 molecular proportion) were dissolved in a suitable organic solvent, for example ethyl alcohol, and heated to substantially 80° C. for a suitable period of time, for example 11 hours in the presence of a small quantity of a suitable catalyst, for example hydrochloric acid. On completion of the reaction, the solvent was removed by a convenient method, as for example by distillation and the residue washed with water until neutral and dried. The product so obtained, comprising a light brown powder melting at substantially 78° to 85° C. was incorporated in the usual manner in a rubber stock comprising

| | Parts |
|---|---|
| Pale crepe rubber | 100 |
| Zinc oxide | 60 |
| Lithopone | 20 |
| Sulfur | 2 |
| Benzo-thiazyl-thio-benzoate | 0.825 |
| Diphenyl guanidine phthalate | 0.675 |
| Paraffin | 0.250 |
| Benzaldehyde derivative of the condensation product of cyclohexanone and phenol | 1.0 |

The compounded rubber stock was vulcanized by heating in a press for different periods of time at the temperature of twenty pounds of steam pressure per square inch (that is 258° F.). Portions of the stock cured as set forth were then elongated 50% and artificially aged by heating for 4 hours in the air bomb maintained at a temperature of 121° C. and under a pressure of 100 pounds of air per square inch. The modulus and tensile characteristics of the aged and unaged vulcanized rubber stocks follow:

*Table II*

| Cure | | Hrs. aged | Modulus of elasticity in lbs/in.² at elongations of— | | Tensile at break in lbs/in.² | Ult. elong., percent |
|---|---|---|---|---|---|---|
| Time, mins. | Lbs. steam pressure | | 300% | 500% | | |
| 30 | 20 | 0 | 648 | 1960 | 3820 | 675 |
| 30 | 20 | 4 | 382 | 1138 | 1653 | 600 |
| 45 | 20 | 0 | 690 | 2023 | 3910 | 660 |
| 45 | 20 | 4 | 498 | 1383 | 1730 | 575 |
| 60 | 20 | 0 | 675 | 2050 | 3850 | 650 |
| 60 | 20 | 4 | 427 | 1210 | 1755 | 605 |

The data set forth in Table II show the desirable age resisting properties of the new and preferred class of materials, as even on undergoing the extremely exaggerated aging conditions of the air bomb, the rubber stocks employing said antioxidant possess to a large degree the properties of the unaged rubber product.

As a further embodiment of the present invention 27 parts by weight of the cyclohexanone-phenol condensation product were heated with 150 parts by weight of 40% aqueous formaldehyde solution at substantially 90 to 95° C. for a convenient period of time, for example two hours. The solid, comprising the crude reaction product, was filtered off, washed with water and dried. The dried product, melting at substantially 170 to 176° C., was incorporated in a rubber stock comprising

| | Parts |
|---|---|
| Pale crepe rubber | 100 |
| Zinc oxide | 60 |
| Lithopone | 20 |
| Sulfur | 2 |
| Benzo-thiazyl-thio-benzoate | 0.825 |
| Diphenyl guanidine phthalate | 0.675 |
| Paraffin | 0.25 |
| Formaldehyde derivative of the condensation product of cyclohexanone and phenol | 1.0 |

The rubber stock so compounded was vulcanized and the cured rubber product aged in the Bierer-Davis oxygen bomb at a temperature of 70° C. and under 300 pounds of oxygen pressure per square inch. The results obtained on testing the aged and unaged rubber stocks are given in Table III.

*Table III*

| Cure | | Hrs. aged | Modulus of elasticity in lbs/in.² at elongations of 500% | Tensile at break in lbs/in.² | Ult. elong., percent |
|---|---|---|---|---|---|
| Time, mins. | Lbs. steam pressure | | | | |
| 30 | 20 | 0 | 1665 | 3860 | 700 |
| 30 | 20 | 120 | 2285 | 3545 | 620 |
| 45 | 20 | 0 | 1810 | 4160 | 700 |
| 45 | 20 | 120 | 2380 | 3955 | 630 |
| 60 | 20 | 0 | 1840 | 4180 | 690 |
| 60 | 20 | 120 | 2240 | 3980 | 640 |

Portions of the above unaged vulcanized rubber stocks, wherein the formaldehyde derivative of the reaction product of cyclohexanone and phenol was incorporated as antioxidant, showed substantially no discoloration on exposing to ultra violet light rays in the manner hereinbefore set forth. Furthermore, on exposing portions of the same unaged stocks to sunlight for seven days, no change in color was produced.

From the data hereinbefore set forth, it is shown that rubber compositions containing small proportions of the preferred class of materials markedly resist the deterioration influences of light, heat and oxygen.

Obviously, the practice of this invention is not limited to the specific compositions given above, such compositions being merely illustrative of the manner of employing the antioxidant or age resisters of this invention. The antioxidant or age resistors may be employed in conjunction with other vulcanizing agents than those specifically disclosed, for this invention is applicable generally to pure rubber or rubber compositions of the most varied nature.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, guttapercha, rubber isomers and like products, whether or not admixed with fillers, pigments, vulcanizing or accelerating agents.

The present invention is limited solely by the claims attached hereto as a part of the present specification.

What is claimed is:

1. The method of preserving rubber which comprises treating rubber with the reaction product of substantially two molecular proportions of an aliphatic aldehyde and substantially one molecular proportion of 1,1-di(p-hydroxy phenyl) cyclohexane.

2. The vulcanized rubber product produced by heating rubber and sulfur in the presence of a reaction product of substantially two molecular proportions of an aliphatic aldehyde and substantially one molecular proportion of 1,1-di(p-hydroxy phenyl) cyclohexane.

3. The method of preserving rubber which comprises treating rubber with a reaction product of substantially one molecular proportion of 1,1-di(p-hydroxy phenyl) cyclohexane and substantially two molecular proportions of butyl aldehyde.

4. The method of preserving rubber which comprises treating rubber with a formaldehyde derivative of 1,1-di(p-hydroxy phenyl) cyclohexane.

5. The method of preserving rubber which comprises treating rubber with a reaction product of substantially one molecular proportion of 1,1-di(p-hydroxy phenyl) cyclohexane and substantially two molecular proportions of benzaldehyde.

6. A composition comprising rubber and a reaction product of substantially two molecular proportions of butyl aldehyde and substantially one molecular proportion of 1,1-di(p-hydroxy phenyl) cyclohexane.

7. A composition comprising rubber and a formaldehyde derivative of 1,1-di(p-hydroxy phenyl) cyclohexane.

8. A composition comprising rubber and a reaction product of substantially two molecular proportions of benzaldehyde and substantially one molecular proportion of 1,1-di(p-hydroxy phenyl) cyclohexane.

9. The vulcanized rubber product produced by heating rubber and sulfur in the presence of a reaction product of substantially two molecular proportions of butyl aldehyde and substantially one molecular proportion of 1,1-di(p-hydroxy phenyl) cyclohexane.

10. The vulcanized rubber product produced by heating rubber and sulfur in the presence of a formaldehyde derivative of 1,1-di(p-hydroxy phenyl) cyclohexane.

11. The vulcanized rubber product produced by heating rubber and sulfur in the presence of a reaction product of substantially two molecular proportions of benzaldehyde and substantially one molecular proportion of 1,1-di(p-hydroxy phenyl) cyclohexane.

12. The method of preserving rubber which comprises treating rubber with an aldehyde derivative of a di(hydroxy phenyl) cyclohexane.

13. The method of preserving rubber which comprises treating rubber with an aliphatic aldehyde derivative of 1,1-di(p-hydroxy phenyl) cyclohexane.

14. A composition comprising rubber and an aldehyde derivative of a di(hydroxy phenyl) cyclohexane.

15. A composition comprising rubber and an aliphatic aldehyde derivative of 1,1-di(p-hydroxy phenyl) cyclohexane.

16. The method of preserving rubber which comprises treating rubber with an aldehyde derivative of a ketone-phenol condensation product, said ketone being selected from the group consisting of acetone, methyl ethyl ketone, cyclohexanone, and methyl and ethyl substituted cyclohexanone, wherein the ketonic oxygen atom of said ketone is replaced by two para hydroxy substituted phenyl radicals.

17. A composition comprising rubber and an aldehyde derivative of a ketone-phenol condensation product, said ketone being selected from the group consisting of acetone, methyl ethyl ketone, cyclohexanone, and methyl and ethyl substituted cyclohexanone, wherein the ketonic oxygen atom of said ketone is replaced by two para hydroxy substituted phenyl radicals.

18. The method of preserving rubber which comprises treating rubber with an aliphatic aldehyde derivative of a ketone-phenol condensation product, said ketone being selected from the group consisting of acetone, methyl ethyl ketone, cyclohexanone, and methyl and ethyl substituted cyclohexanone, wherein the ketonic oxygen atom of said ketone is replaced by two para hydroxy substituted phenyl radicals.

19. A composition comprising rubber and an aliphatic aldehyde derivative of a ketone-phenol condensation product, said ketone being selected from the group consisting of acetone, methyl ethyl ketone, cyclohexanone and methyl and ethyl substituted cyclohexanone, wherein the ketonic oxygen atom of said ketone is replaced by two para hydroxy substituted phenyl radicals.

ROBERT L. SIBLEY.